United States Patent
Oren et al.

(10) Patent No.: US 7,065,083 B1
(45) Date of Patent: Jun. 20, 2006

(54) METHOD AND APPARATUS FOR DYNAMICALLY GENERATING LOOKUP WORDS FOR CONTENT-ADDRESSABLE MEMORIES

(75) Inventors: Eyal Oren, Raanana (IL); David E. Belz, Raanana (IL)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 09/974,296

(22) Filed: Oct. 4, 2001

(51) Int. Cl.
*H04L 12/28* (2006.01)

(52) U.S. Cl. .................. 370/392; 370/401; 711/108

(58) Field of Classification Search .................. None
See application file for complete search history.

(56) References Cited

U.S. PATENT DOCUMENTS

| | | | |
|---|---|---|---|
| 3,648,254 A | 3/1972 | Beausoleil | |
| 4,296,475 A | 10/1981 | Nederlof et al. | |
| 4,791,606 A | 12/1988 | Threewitt et al. | |
| 4,996,666 A | 2/1991 | Duluk, Jr. | |
| 5,088,032 A | 2/1992 | Bosack | |
| 5,319,763 A | 6/1994 | Ho et al. | |
| 5,383,146 A | 1/1995 | Threewitt | |
| 5,440,715 A | 8/1995 | Wyland | |
| 5,450,351 A | 9/1995 | Heddes | |
| 5,481,540 A | 1/1996 | Huang | |
| 5,515,370 A | 5/1996 | Rau | |
| 5,566,170 A * | 10/1996 | Bakke et al. | 370/392 |
| 5,740,171 A | 4/1998 | Mazzola et al. | |
| 5,841,874 A | 11/1998 | Kempke et al. | |
| 5,842,040 A | 11/1998 | Hughes et al. | |
| 5,898,689 A | 4/1999 | Kumar et al. | |
| 5,917,821 A * | 6/1999 | Gobuyan et al. | 370/392 |
| 5,920,886 A | 7/1999 | Feldmeier | |
| 5,930,359 A | 7/1999 | Kempke et al. | |
| 5,956,336 A | 9/1999 | Loschke et al. | |
| 5,978,885 A | 11/1999 | Clark, II | |
| 6,000,008 A | 12/1999 | Simcoe | |
| 6,041,389 A | 3/2000 | Rao | |
| 6,047,369 A | 4/2000 | Colwell et al. | |
| 6,061,368 A | 5/2000 | Hitzelberger | |

(Continued)

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

*Primary Examiner*—Duc Ho
*Assistant Examiner*—Phuongchau Ba Nguyen
(74) *Attorney, Agent, or Firm*—The Law Office of Kirk D. Williams

(57) ABSTRACT

Methods and apparatus are disclosed for using a programmable lookup word generator to produce a lookup word for use by a content-addressable memory. The programmable lookup word generator includes a profile memory which contains instructions on how to build a particular lookup word. The programmable lookup word generator receives a set of information and possibly other operands typically including a profile selection. Based on the profile selection, a set of instructions is retrieved from the profile memory. Control logic uses this set of instructions to build the lookup word by extracting portions of the received information and other operands and ordering these extracted portions possibly with additional information to build the lookup word. The lookup word is then used by a CAM, typically to classify the received set of information and other operands. In one context, the CAM produces a packet classification indication in a communication or computer system.

24 Claims, 5 Drawing Sheets

U.S. PATENT DOCUMENTS

| | | | |
|---|---|---|---|
| 6,069,573 | A | 5/2000 | Clark, II et al. |
| 6,081,440 | A | 6/2000 | Washburn et al. |
| 6,091,725 | A | 7/2000 | Cheriton et al. |
| 6,097,724 | A | 8/2000 | Kartalopoulos |
| 6,134,135 | A | 10/2000 | Andersson |
| 6,137,707 | A | 10/2000 | Srinivasan et al. |
| 6,141,738 | A | 10/2000 | Munter et al. |
| 6,148,364 | A | 11/2000 | Srinivasan et al. |
| 6,154,384 | A | 11/2000 | Nataraj et al. |
| 6,172,990 | B1 * | 1/2001 | Deb et al. .................. 370/474 |
| 6,175,513 | B1 | 1/2001 | Khanna |
| 6,181,698 | B1 | 1/2001 | Hariguchi |
| 6,199,140 | B1 | 3/2001 | Srinivasan et al. |
| 6,236,658 | B1 | 5/2001 | Essbaum et al. |
| 6,237,061 | B1 | 5/2001 | Srinivasan et al. |
| 6,240,003 | B1 | 5/2001 | McElroy |
| 6,243,667 | B1 | 6/2001 | Kerr et al. |
| 6,246,601 | B1 | 6/2001 | Pereira |
| 6,295,576 | B1 | 9/2001 | Ogura et al. |
| 6,307,855 | B1 | 10/2001 | Hariguchi |
| 6,374,326 | B1 | 4/2002 | Kansal et al. |
| 6,377,577 | B1 | 4/2002 | Bechtolsheim et al. |
| 6,389,506 | B1 | 5/2002 | Ross et al. |
| 6,526,474 | B1 | 2/2003 | Ross |
| 6,535,951 | B1 * | 3/2003 | Ross ........................ 711/108 |
| 6,606,317 | B1 * | 8/2003 | Beadle et al. ............... 370/390 |
| 6,658,002 | B1 | 12/2003 | Ross et al. |
| 6,725,326 | B1 * | 4/2004 | Patra et al. ................ 711/108 |
| 6,738,862 | B1 | 5/2004 | Ross et al. |
| 6,744,652 | B1 * | 6/2004 | Srinivasan et al. .......... 365/49 |
| 6,771,646 | B1 * | 8/2004 | Sarkissian et al. ......... 370/252 |
| 6,775,737 | B1 | 8/2004 | Warkhede et al. |
| 6,862,281 | B1 | 3/2005 | Chandrasekaran |
| 6,904,057 | B1 * | 6/2005 | Sarkinen et al. ............ 370/392 |
| 6,944,168 | B1 * | 9/2005 | Paatela et al. .............. 370/392 |
| 2002/0103925 | A1 * | 8/2002 | Sheth et al. ................ 709/236 |
| 2003/0046429 | A1 * | 3/2003 | Sonksen ..................... 709/246 |

OTHER PUBLICATIONS

Tuevo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. la, Music Semiconductors, Milpitas, CA, Sep. 30, 1998, 16 pages.

"Fast IPv4 and IPv4 Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21. 1998, 20 pages.

"Wide Ternary Searches Using Music CAMs and RCPs," Application Note AN-N31, Rev. 0, Music Semiconductors, Milpitas, CA, Apr. 13, 1999, 8 pages.

* cited by examiner

METHOD AND APPARATUS FOR DYNAMICALLY GENERATING LOOKUP WORDS FOR CONTENT-ADDRESSABLE MEMORIES

FIELD OF THE INVENTION

This invention relates to communications and computer devices, especially routers and packet switching systems; and more particularly, the invention relates to dynamically generating lookup words for use by content-addressable memory devices, especially in the context of packet classification.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded supporting various packet technologies, such as Asynchronous Transfer Mode (ATM) and Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, typically a packet classification operation must be performed on the packet to determine how to manipulate the received packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification use custom application-specific integrated circuits (ASICs), custom circuitry, software or firmware controlled processors, binary content-addressable memories (CAMs) and ternary content-addressable memories (TCAMs). The use of programmable software or firmware have advantages as they provide some level of flexibility, which becomes especially important as new protocols and services are added to existing network. Customer typically desire to use their existing hardware (e.g., routers, switches etc.) to support these new protocols and services. However, known software and firmware implementations are relatively slow, and typically place a performance bound which may be incompatible with new requirements. CAMS and TCAMs are increasingly being used in packet classification especially because of their performance, but known systems incorporating CAMs and TCAM are not flexible enough to support new protocols and applications, especially because their inputs are typically designed to provide only the needed data inputs for handling known protocols and applications. Needed are new methods and systems which are fast and adaptable to new protocols and applications.

SUMMARY OF THE INVENTION

Systems and methods are disclosed for generating a lookup word for use by a content-addressable memory, especially for using in classifying a set of information. One embodiment includes a programmable lookup word generator which receives the set of information and produces a result. The programmable lookup word generator of one embodiment includes a profile memory for storing a set of instructions for generating the result and a selection mechanism for selecting portions of the set of information in response to the set of instructions. A content-addressable memory typically receives the result and generates one or more indications.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
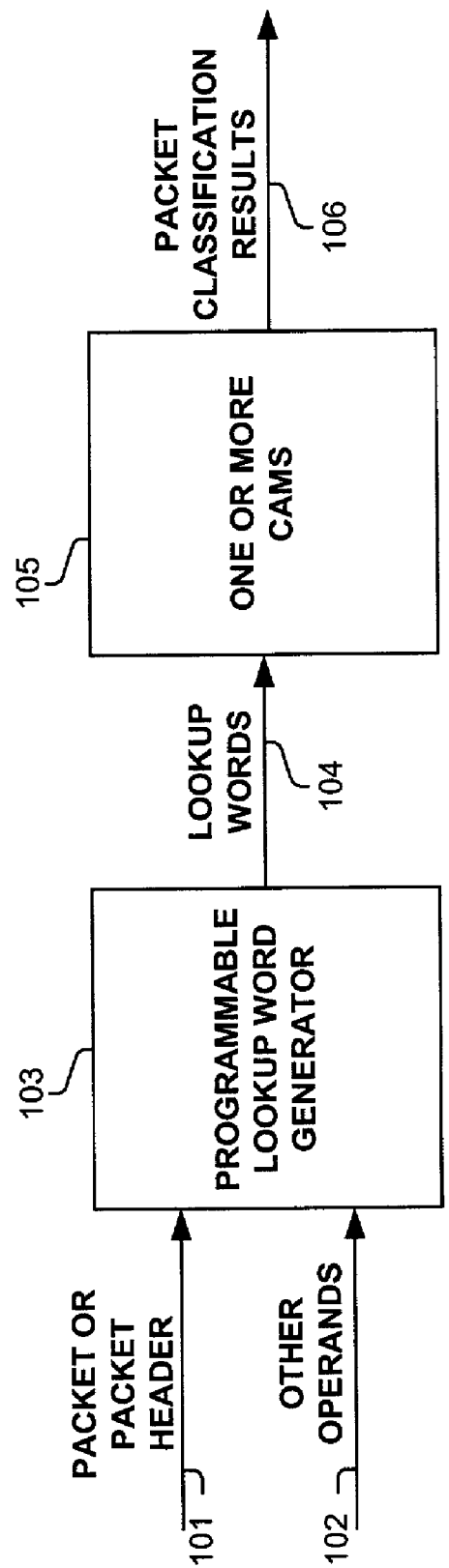
FIG. 1 is a block diagram of an exemplary embodiment of a programmable lookup word generator and CAM used in classifying packets.

Methods and apparatus are disclosed for using a programmable lookup word generator to produce a lookup word for use by a content-addressable memory. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention.

As used herein, "content-addressable memory" or "CAM" refers to an associative memory, including, but not limited to ternary and binary content-addressable memory, or mechanisms using hash tables, TRIEs, etc. that perform the functionality of a content-addressable memory (e.g., performs a lookup operation to identify one or more entries whose value matches an input lookup word if a match exits in the content-addressable memory, in contrast to a random access memory (RAM) lookup operation which retrieves a value based on an address in the RAM). The term "packet" refers to packets of all types, including, but not limited to, fixed length cells and variable length packets, each of which may or may not be divisible into smaller packets or cells.

Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating address spaces, a routine of a library and/or standalone application, and is not limited to any particular memory partitioning technique. The terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information.

Methods and apparatus are disclosed for using a programmable lookup word generator to produce a lookup word for use by a content-addressable memory. In one embodiment, the programmable lookup word generator includes a profile memory that contains instructions on how to build a particular lookup word. The programmable lookup word generator receives a set of information and other operands typically including a profile selection. Based on the profile selection, a set of instructions is retrieved from the profile memory. Control logic uses this set of instructions to build the lookup word by extracting portions of the received information and other operands, and ordering these extracted portions and possibly supplementing with additional information or fields to build the lookup word. The lookup word is then used by a CAM, typically to classify the received set of information and other operands. In one context, the set of information includes a packet or packet header, and the CAM produces a packet classification indication in a communication or computer system.

FIG. 1 illustrates one embodiment of a programmable lookup word generator 103 used in a computer or communications system, including, but not limited to a router or packet switching system. Programmable lookup word generator 103, especially when used in the context of a packet classification system, receives as input a packet or packet header 101 and other operands 102 (e.g., service or routing information, type or quality of service, etc.). In one embodiment, other operands 102 includes a profile selection to identify which of multiple pre-programmed operations are to be performed to generate the particular lookup word from the received information. Programmable lookup word generator 103 produces lookup words 104 which are typically used for subsequent processing. In the embodiment illustrated in FIG. 1, one or more CAMs 105 (e.g., binary or ternary CAMs or other associative memories) use lookup words 104 to generate packet classification results 106.

Figure 2:
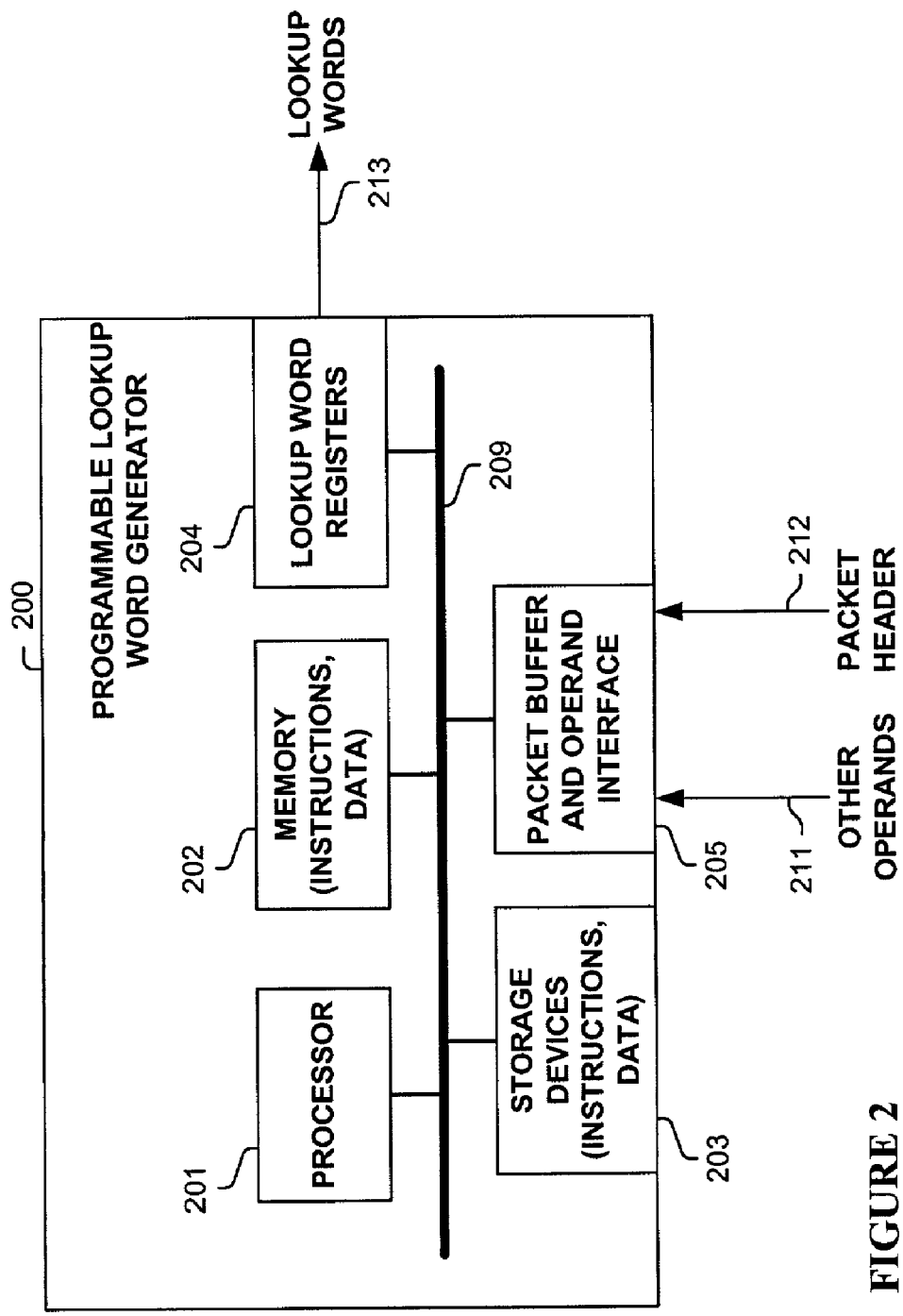
FIG. 2 is a block diagram of one embodiment of a programmable lookup word generator including memory and a processor.

FIG. 2 illustrates one embodiment of a programmable lookup word generator 200. Programmable lookup word generator 200 may be part of a computer or communications system, including, but not limited to a packet switching system, router, etc. As shown, programmable lookup word generator 200 comprises a processor 201, memory 202, storage devices 203, lookup word registers 204 (which will contain the resulting lookup words 213), and packet buffer and operand interface 205 (to receive other operands 211 and packet header 212 in one embodiment), which are electrically coupled via one or more communications mechanisms 209 (shown as a bus for illustrative purposes). Various embodiments of programmable lookup word generator 200 may include more or less elements.

The operation of programmable lookup word generator 200 is typically controlled by processor 201 using memory 202 and storage devices 203. Memory 202 is one type of computer-readable medium, and typically comprises random access memory (RAM), read only memory (ROM), integrated circuits, and/or other memory components. Memory 202 typically stores computer-executable instructions to be executed by processor 201 and/or data which is manipulated by processor 201 for implementing functionality in accordance with the invention. Storage devices 203 are another type of computer-readable medium, and typically comprise disk drives, diskettes, networked services, tape drives, and other storage devices. Storage devices 203 typically store computer-executable instructions to be executed by processor 201 and/or data which is manipulated by processor 201 for implementing functionality in accordance with the invention.

As used herein and contemplated by the invention, computer-readable medium is not limited to memory and storage devices; rather computer-readable medium is an extensible term which may include other tangible storage mechanisms.

In one embodiment, memory 202 or storage devices 203 is pre-programmed with instructions to be used by processor 201 in producing lookup words 213. A packet header 212 (or packet or a set of information) is received along with optional other operands 211 by packet buffer and operand interface 205. In one embodiment, other operands 211 include a profile selection to identify a set of processing operations to be performed in generating lookup words 213. Processor 201 (or control logic), in response to instructions stored in memory 202 or storage devices 203 and possibly in response to other operands 211, generates lookup words 213 based on packet header 212 and other operands 211 and stores the result in lookup word registers 204. Lookup words 213 are retrieved from lookup word registers 204 and exported for further processing.

Figure 3:
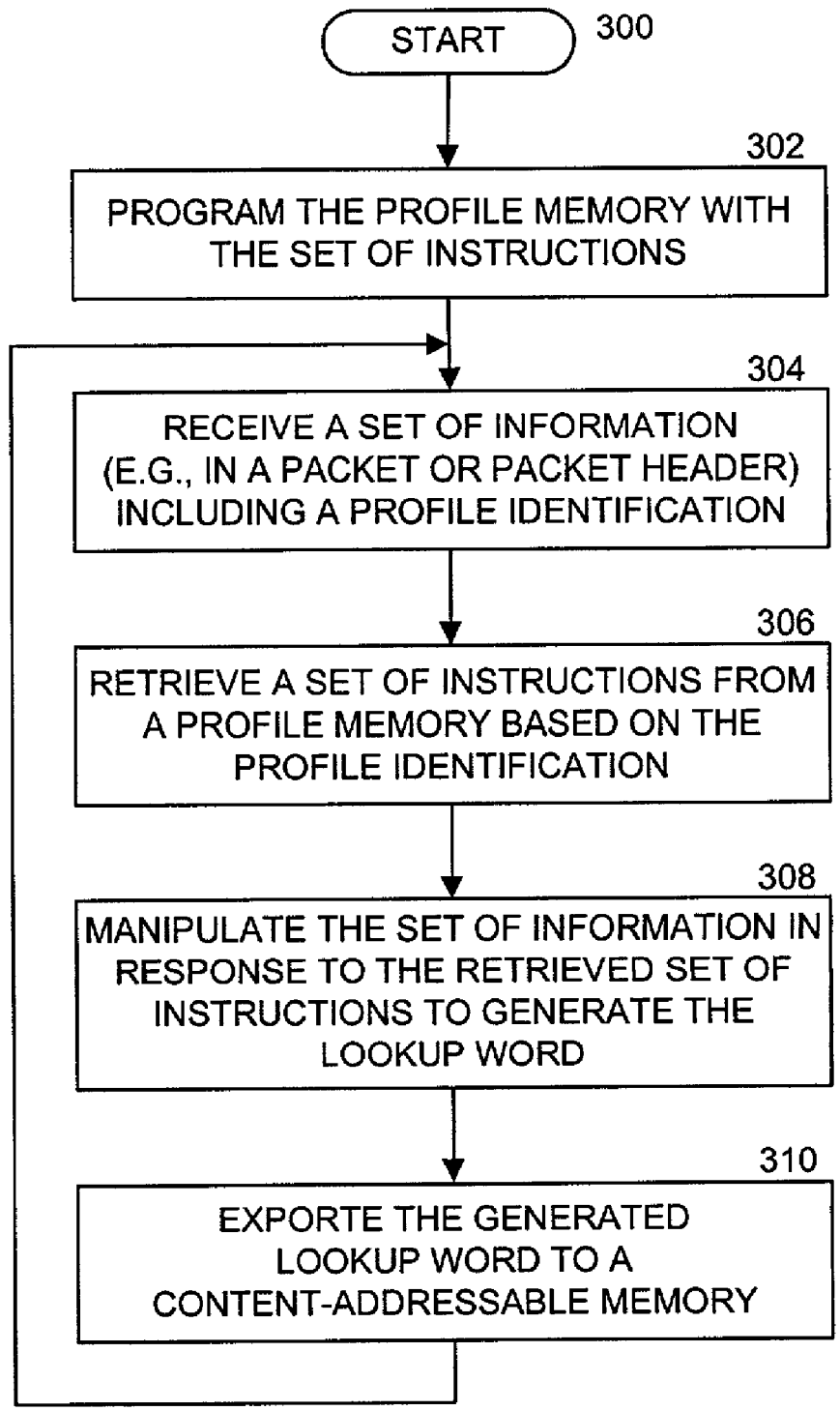
FIG. 3 is a flow diagram of a process employed by one embodiment of a programmable lookup word generator.

The flow diagram illustrated in FIG. 3 further illustrates the operation of one embodiment of a programmable lookup word generator. Processing begins at process block 300, and proceeds to process block 302, wherein the profile memory is programmed with multiple sets of instructions. Process blocks 304–310 are then repetitively performed to generate lookup words based on newly received information. In process block 304, a set of information is received (e.g., in a packet, packet header, or via some other communications or memory retrieval mechanism, etc.), which includes a profile identification. Next, in process block 306, a set of instructions is received from the profile memory based on the received profile identification. In process block 308, the set of information is manipulated in response to the retrieved set of instructions to generate the lookup word, and in process block 310, the generated lookup word is exported to a content-addressable memory.

Figure 4A:
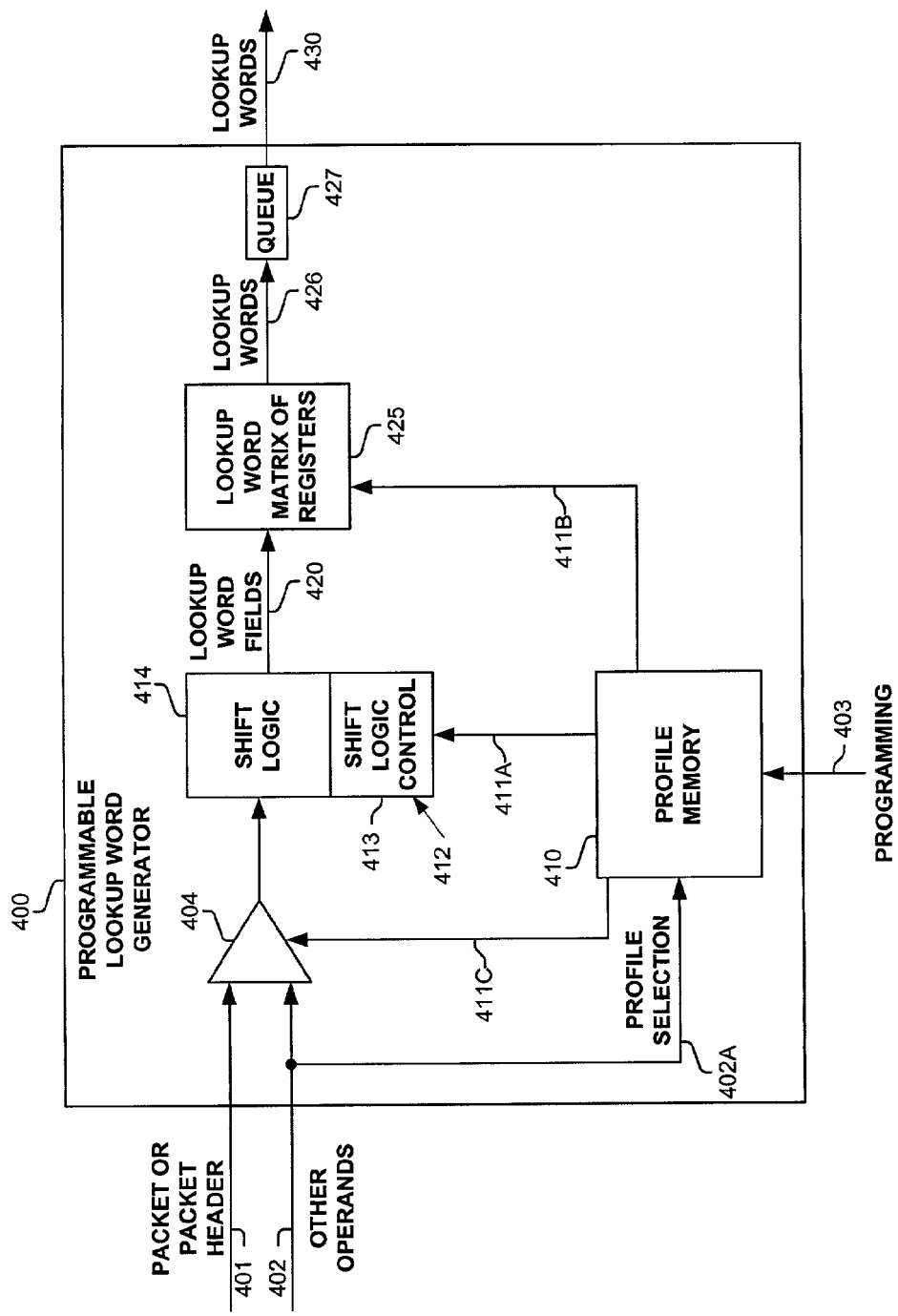
FIGS. 4A–B illustrate an exemplary embodiment of a programmable lookup word generator including a profile memory, shift logic and a matrix of registers.

FIG. 4A illustrates an embodiment of a programmable lookup word generator 400. Profile memory 410 is preprogrammed over programming line 403 (or via some other known or future developed memory update mechanism) to contain instructions for generating the resultant lookup word fields 420. Programmable lookup word generator 400 may be used in many applications, such as packet classification in a computer or communications device. In this context, programmable lookup word generator 400 typically receives a packet header or packet 401, other operands 402 (e.g., service or routing information, type or quality of service, etc.) and/or constants that are programmed in profile memory 410 (or via some other mechanism) in building lookup words 430. Typically, other operands 402 includes a profile selection 402A, although this may be included in any other input or provided or determined by another mechanism.

Based on profile selection 402A, profile memory 410 generates an output set of instructions 411A which is transmitted to shift unit 412 (or another known or future developed data manipulation unit.) In one embodiment, shift unit 412 includes shift logic control 413 and shift logic 414. Profile memory 410 controls multiplexer 404 via control signal or instructions 411C, which is used to select which input, packet header or packet 401 or other operands 402, is provided at what time to shift unit 412. Responsive to the output set of instructions 411A and 411B, lookup word matrix of registers 425 and shift logic 414 (controlled by shift logic control 413) extract and arrange data from packet or packet header 401 and received other operands 402 to generate lookup words 426. Typically, when multiple lookup words 426 are simultaneously generated, then lookup words 426 are stored in a queue 427 and sequentially exported as lookup words 430.

Figure 4B:
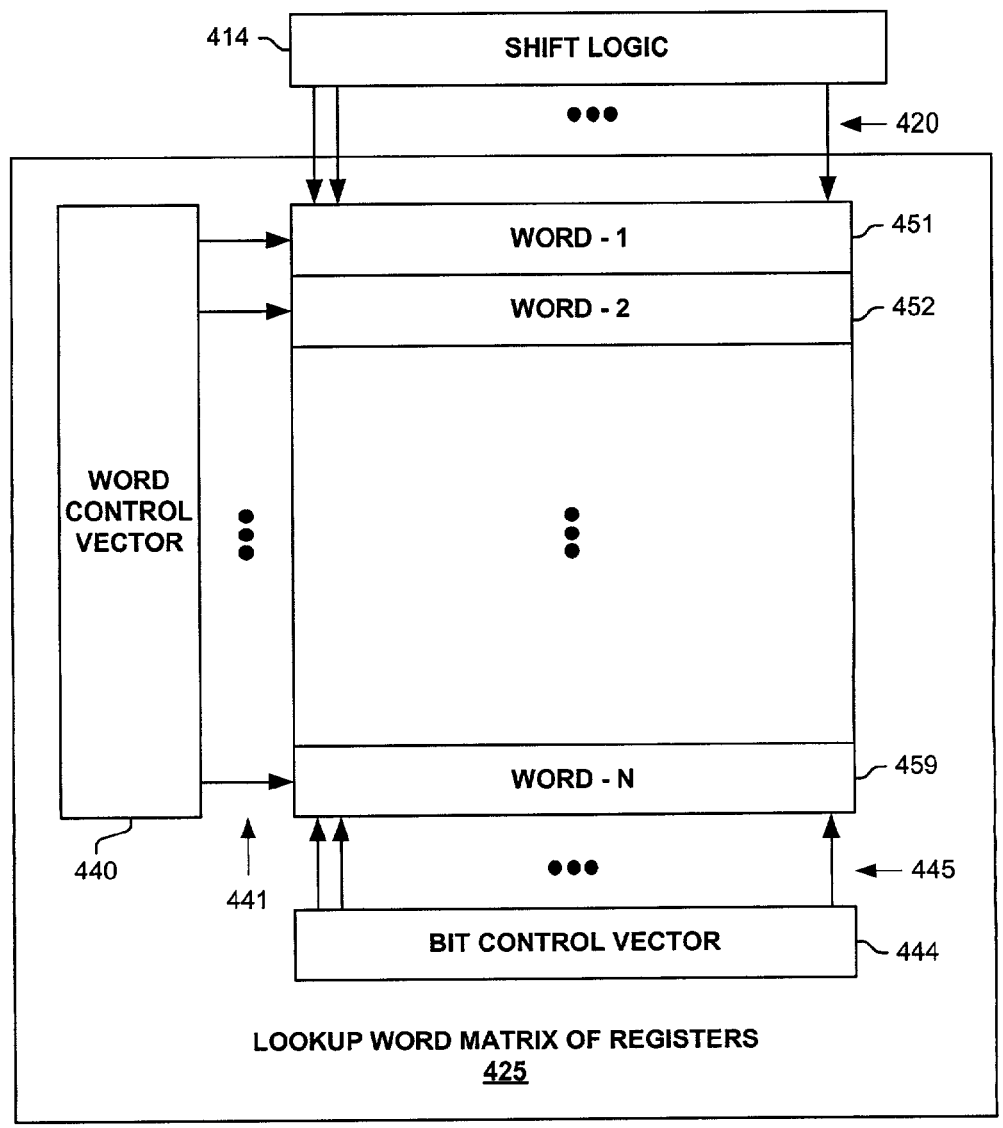

FIG. 4B further illustrates one embodiment of the coordinated operation of shift logic 414 and lookup word matrix of registers 425. Lookup word matrix of registers 425 of one embodiment includes multiple words 451–459 (e.g., banks of registers) which are enabled in response to the values of word control vector 440 (over control lines 441) and bit control vector 444 (over control lines 445). Fields of received packets or information are stored in shift logic 414, with their position within shift logic 414 being adjustable. The values of shift logic 414 as well as word control vector 440 and bit control vector 444 (retrieved from profile memory 410 shown FIG. 4A) are controlled in a programmatic manner. Based on the values of word control vector 440 and bit control vector 444, individual bit positions of shift logic 414 are simultaneously copied into one or more words 451–459. By appropriately programming profile memory 410 shown in FIG. 4A, a lookup word can be generated from any received field or bit position within such field, and multiple lookup words can be dynamically and generated simultaneously and/or in a streamlined and efficient manner.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A system comprising:
a programmable lookup word generator to receive a set of information and to produce a lookup word, the programmable lookup word generator including:
a profile memory configured to store a set of instructions for generating the lookup word; and
a selection mechanism for selecting portions of the set of information in response to the set of instructions retrieved from the profile memory, the selection mechanism including a matrix of storage elements and shift logic for use in generating the lookup word; and
a content-addressable memory, coupled to the programmable lookup word generator, configured to receive said generated lookup word and to perform a lookup operation based on said generated lookup word in order to generate one or more lookup result indications.

2. The system of claim 1, further comprising a queue coupled to the matrix of storage elements and the content-addressable memory.

3. The system of claim 1, wherein the profile memory is responsive to a profile selection in retrieving the set of instructions used by the selection mechanism; and wherein the received set of information includes the profile selection.

4. The system of claim 3, wherein the programmable lookup word generator includes a shift logic control unit responsive to the set of instruction for controlling said shift logic.

5. The system of claim 1, wherein the programmable lookup word generator includes a shift logic control unit responsive to the set of instruction for controlling said shift logic.

6. The system of claim 1, wherein the set of information includes information contained in a packet.

7. The system of claim 1, wherein the set of information includes one or more fields from a header of the packet.

8. The system of claim 1, wherein the set of information includes an indication of other information not contained in the packet.

9. The system of claim 1, wherein the content-addressable memory is a binary content-addressable memory.

10. The system of claim 1, wherein the content-addressable memory is a ternary content-addressable memory.

11. A packet switching system including the system of claim 1.

12. A computer system including the system of claim 1.

13. A communications system including the system of claim 1.

14. A router including the system of claim 1.

15. A method for generating a lookup word, the method comprising:
   receiving a set of information including a profile identification;
   retrieving a set of instructions from a profile memory based on the profile identification;
   manipulating the set of information in response to the set of instructions to generate the lookup word, said manipulation including controlling a selection mechanism, the selection mechanism including a matrix of storage elements and shift logic for use in generating the lookup word; and
   exporting the lookup word to a content-addressable memory for use by said content-addressable memory in performing a lookup operation to identify one or more content-addressable memory lookup results.

16. The method of claim 15, further comprising programming the profile memory with the set of instructions.

17. The method of claim 15, wherein the set of information includes information related to a packet, and said one or more content-addressable memory results include a packet classification.

18. The system of claim 15, wherein the content-addressable memory is a binary content-addressable memory.

19. The system of claim 15, wherein the content-addressable memory is a ternary content-addressable memory.

20. A system for generating a lookup word, the system comprising:
   means for receiving a set of information including a profile identification;
   means for retrieving a set of instructions from a profile memory based on the profile identification;
   means for manipulating the set of information in response to the set of instructions to generate the lookup word, said means for manipulating the set of information includes a matrix of storage elements and shift logic for use in generating the lookup word; and
   means for exporting the generated lookup word to a content-addressable memory for use by said content-addressable memory in performing a lookup operation to identify one or more content-addressable memory lookup results.

21. The system of claim 20, wherein said means for manipulating the set of information includes means for controlling shift logic.

22. The system of claim 20, wherein the set of information includes information related to a packet.

23. The system of claim 20, wherein the content-addressable memory is a binary content-addressable memory.

24. The system of claim 20, wherein the content-addressable memory is a ternary content-addressable memory.

* * * * *